United States Patent
Gibbons et al.

(10) Patent No.: US 10,999,280 B2
(45) Date of Patent: *May 4, 2021

(54) BULK DELIVERY OF CHANGE OF AUTHORIZATION DATA VIA AAA PROTOCOLS

(71) Applicant: Juniper Networks, Inc., Sunnyvale, CA (US)

(72) Inventors: John Gibbons, Ashland, MA (US); Paul Raison, Windham, NH (US); Sunil Madhaorao Gandhewar, Umarkhed (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/748,708

(22) Filed: Jan. 21, 2020

(65) Prior Publication Data
US 2020/0162460 A1 May 21, 2020

Related U.S. Application Data

(63) Continuation of application No. 15/474,285, filed on Mar. 30, 2017, now Pat. No. 10,547,614.

(51) Int. Cl.
*H04L 29/06* (2006.01)
*H04W 12/08* (2021.01)
*H04L 12/801* (2013.01)

(52) U.S. Cl.
CPC ........ *H04L 63/0892* (2013.01); *H04L 63/102* (2013.01); *H04W 12/08* (2013.01); *H04L 47/10* (2013.01); *H04L 63/10* (2013.01)

(58) Field of Classification Search
CPC ........... H04L 63/08–0892; H04L 47/10; H04L 47/16; H04W 12/08
See application file for complete search history.

(56) References Cited

U.S. PATENT DOCUMENTS

| 9,553,861 B1 | 1/2017 | Bogdanovic et al. |
| 10,547,614 B2 | 1/2020 | Gibbons et al. |

(Continued)

FOREIGN PATENT DOCUMENTS

| CN | 1489332 A | 4/2004 |
| CN | 101001156 A | 7/2007 |
| CN | 101252788 A | 8/2008 |
| CN | 102045304 A | 5/2011 |
| CN | 105553790 A | 5/2016 |

OTHER PUBLICATIONS

Intent to Grant dated Feb. 7, 2020, from counterpart European Application No. 18152919.9, 49 pp.

(Continued)

*Primary Examiner* — Kristine L Kincaid
*Assistant Examiner* — Shaqueal D Wade
(74) *Attorney, Agent, or Firm* — Shumaker & Sieffert, P.A.

(57) ABSTRACT

In general, techniques are described for supporting bulk delivery of change of authorization data in authentication, authorization, and accounting (AAA) protocols, where delivery is performed as a change of authorization after a subscriber has successfully authenticated and initially authorized. In one example, the techniques are directed to a method including determining, by a RADIUS server for a service provider network, change of authorization data for services to which the subscriber of the service provider network has subscribed. The method further includes generating, by the RADIUS server, RADIUS messages that form a transaction between the RADIUS server and a network access server acting as a RADIUS client. The RADIUS messages provide all of the change of authorization data to the network access server prior to the network access server provisioning the services. The method further includes outputting, by the RADIUS server, the RADIUS messages to the network access server.

19 Claims, 6 Drawing Sheets

(56) References Cited

U.S. PATENT DOCUMENTS

| | | |
|---|---|---|
| 2003/0200277 A1 | 10/2003 | Kim |
| 2004/0073651 A1 | 4/2004 | Beaulieu et al. |
| 2005/0177515 A1 | 8/2005 | Kalavade et al. |
| 2006/0114872 A1* | 6/2006 | Hamada ............... H04L 63/162 370/338 |
| 2006/0187854 A1* | 8/2006 | Booth, III ........... H04L 12/4691 370/254 |
| 2008/0254793 A1 | 10/2008 | Panda et al. |
| 2010/0054217 A1* | 3/2010 | Oulai ................... H04W 28/06 370/338 |
| 2010/0095011 A1 | 4/2010 | Sarikaya et al. |
| 2011/0202592 A1 | 8/2011 | Hart et al. |
| 2013/0089013 A1 | 4/2013 | Carnero Ros et al. |
| 2013/0185767 A1 | 7/2013 | Tirupachur Comerica et al. |
| 2015/0049643 A1* | 2/2015 | Sheth ................. H04L 63/0892 370/255 |

OTHER PUBLICATIONS

First Office Action and Search Report, and translation thereof, from counterpart Chinese Application No. 201711488631.2, dated May 28, 2020, 17 pp.

Chiba et al., "Dynamic Authorization Extensions to Remote Authentication Dial in User Services (RADIUS)," RFC 3576, Network Working Group, Jul. 2003, 30 pp.

Chiba et al., "Dynamic Authorization Extensions to Remote Authentication Dial in User Services (RADIUS)," RFC 5176, Jan. 2008, 34 pp.

Perez-Mendez et al., "Support of Fragmentation of RADIUS Packets," RFC 7499, Internet Engineering Task Force, IETF, Apr. 2015, 38 pp.

"RADIUS Vendor-Specific Attributes (VSA)," Cisco IOS Security Configurations Guide, Apr. 1, 2016, 10 pp.

Rigney et al., "Remote Authentication Dial in User Service (RADIUS)," RFC 2865, Network Working Group, Jun. 2000, 76 pp.

Rigney, "RADIUS Accounting," RFC 2866, Network Working Group, Jun. 2000, 28 pp.

Chiba et al., "Dynamic Authorization Extensions to Remote Authentication Dial in User Service (RADIUS)," RFC 5176, Network Working Group, Jan. 2008, 34 pp.

Extended Search Report from counterpart European Application No. 18152919.9, dated Jul. 16, 2018, 9 pp.

Response to Extended Search Report dated Oct. 8, 2018, from counterpart European Application No. 18152919.9, filed Apr. 2, 2019, 11 pp.

Prosecution History from U.S. Appl. No. 15/474,285, dated Jun. 12, 2019 through Oct. 22, 2019, 58 pp.

* cited by examiner

BULK DELIVERY OF CHANGE OF AUTHORIZATION DATA VIA AAA PROTOCOLS

This application is a continuation of U.S. patent application Ser. No. 15/474,285, filed Mar. 30, 2017, the entire contents of which is incorporated herein by reference.

TECHNICAL FIELD

The invention relates to computer networks and, more specifically, to subscriber authentication, authorization, and accounting (AAA) within computer networks.

BACKGROUND

Network service providers typically deploy one or more servers to manage authentication, authorization, and accounting (AAA) functionality for networks that offer services to one or more subscribers. A protocol commonly used by the servers to communicate with clients is the Remote Authentication Dial In User Service (RADIUS) protocol. The RADIUS protocol is described in Carl Rigney et al., "Remote Authentication Dial In User Server (RADIUS)," Network Working Group of the Internet Engineering Task Force (IETF), Request for Comments 2865, June 2000, which is incorporated by reference herein in its entirety (referred to hereinafter as "RFC 2865"). An extension to the RADIUS protocol commonly used to initiate a change of authorization (CoA) is the Dynamic Authorization Extensions to RADIUS. The Dynamic Authorization Extensions to RADIUS is described in Murtaza Chiba et al., "Dynamic Authorization Extensions to Remote Authentication Dial In User Server (RADIUS)," Network Working Group of the Internet Engineering Task Force (IETF), Request for Comments 5176, January 2008, which is incorporated by reference herein in its entirety (referred to hereinafter as "RFC 5176").

During a CoA for a subscriber that has initially authenticated and authorized, the server may provision one or more services using the RADIUS protocol. To provision the services, the server may provide service configuration data (which may also be referred to as "change of authorization data," "CoA data," or simply "authorization data"). A router positioned between the subscriber and the server may provision the services using the service configuration data, thereby allowing the subscriber to utilize the service to access the service provider network.

In some instances, the subscriber may have subscribed to a large number of services that results in the server having to deliver service configuration data that exceeds limits set by the RADIUS protocol, for example, a maximum packet size of 4096 bytes. To send all of the service configuration data, the server may fragment the service configuration data into multiple portions sending each portion via a different RADIUS message. In order to receive the next RADIUS message with the next portion of the service configuration data, the router may process each portion of the service configuration data individually and confirm successful provisioning of the services specified by the portion of the service configuration data sent via the current RADIUS message.

The router may therefore iterate between provisioning some subset of the services specified by the portion of the service configuration data for a CoA in the current RADIUS message and receiving the next RADIUS message until all of the service configuration data has been received and applied. Such iteration may be inefficient, as the router may transition between a relatively complex provisioning process and waiting to receive the next RADIUS message.

SUMMARY

In general, techniques are described for enabling bulk delivery of change of authorization (CoA) data via AAA protocols, such as the Remote Authentication Dial-In User Service (RADIUS) protocol. Rather than require that a router individually process each portion of CoA data prior to receiving the next portion of the CoA data, the server may send multiple RADIUS messages having portions of the CoA data. The server may indicate via the last RADIUS message of the multiple RADIUS messages that all CoA data has been sent. In response to this indication, the router may then perform a provisioning process based on all of the CoA data, thereby allowing the router to perform the provisioning process a single time rather than iterating between provisioning confirming with a response to the server, and waiting for the next RADIUS message.

In one example, the techniques are directed to a method comprising determining, by a RADIUS server for a service provider network, CoA data for a plurality of services to which a subscriber of the service provider network has subscribed. The method further includes generating, by the RADIUS server, a plurality of RADIUS messages that form a transaction between the RADIUS server and a network access server acting as a RADIUS client. The plurality of RADIUS messages provide all of the CoA data to the network access server prior to the network access server provisioning the plurality of services. The network access server is intermediately positioned between a subscriber access device deployed by the subscriber to access the plurality of services and the RADIUS server. The method further includes outputting, by the RADIUS server, the plurality of RADIUS messages to the network access server.

In another example, the techniques are directed to a server that provides authentication, authorization, and accounting services for a service provider network, the server comprising one or more processors coupled to a memory and a RADIUS module. The RADIUS module is configured to determine CoA data for a plurality of services to which a subscriber of the service provider network has subscribed and generate a plurality of RADIUS messages that form a transaction between the RADIUS server and a network access server acting as a RADIUS client. The plurality of RADIUS messages provide all of the CoA data to the network access server prior to the network access server provisioning the plurality of services. The network access server is intermediately positioned between a subscriber access device deployed by the subscriber to access the plurality of services and the RADIUS server. The RADIUS module is further configured to output the plurality of RADIUS messages to the network access server.

In another example, the techniques are directed to a method comprising receiving, by a network access server associated with a subscriber of a service provider network and acting as a RADIUS client, from a RADIUS server for the service provider network, a plurality of RADIUS messages that form a transaction between the network access server and the RADIUS server to provide CoA data for provisioning the plurality of services at the network access server. The network access server is intermediately positioned between a subscriber access device deployed by the subscriber to access the plurality of services and the RADIUS server. In response to determining that all of the CoA data for provisioning the plurality of services at the network access server has been received, the method further includes provisioning, by the network access server, the plurality of services.

In another example, the techniques are directed to a server that provides authentication, authorization, and accounting services for a service provider network. The server includes one or more processors coupled to a memory and a RADIUS module associated with a subscriber of a service provider network and acting as a RADIUS client. The RADIUS module is configured to receive, from a RADIUS server for the service provider network, a plurality of RADIUS messages that form a transaction between the server and the RADIUS server to provide CoA data for provisioning the plurality of services at the server. The server is intermediately positioned between a subscriber access device deployed by the subscriber to access the plurality of services and the RADIUS server. In response to determining that all of the CoA data for provisioning the plurality of services at the network access server has been received, the RADIUS module is configured to provision the plurality of services.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
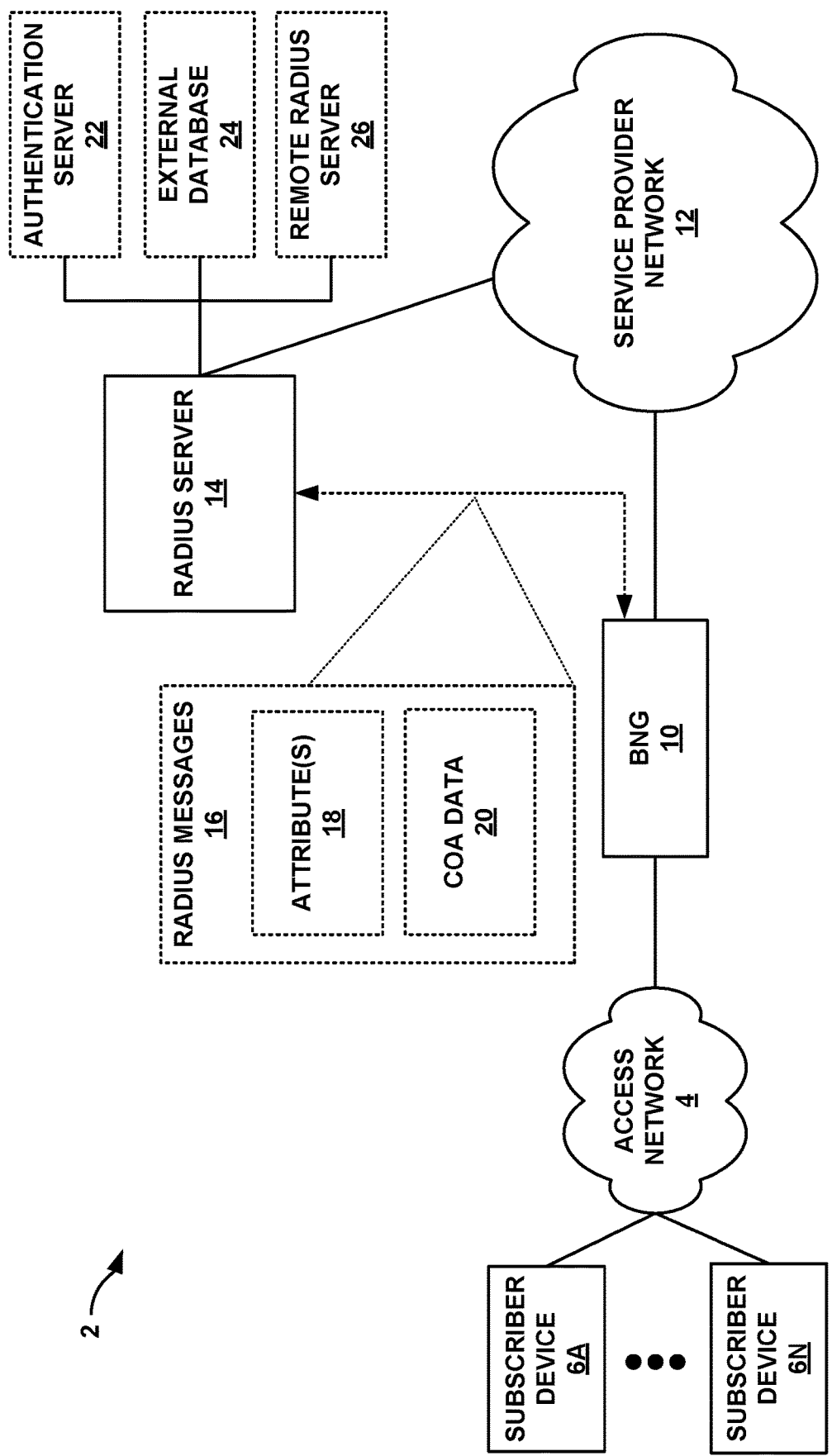
FIG. 1 is a block diagram illustrating a network system having a Remote Access Dial In User Service (RADIUS) server that supports bulk delivery of change of authorization data in accordance with various aspects of the techniques described in this disclosure.

FIG. 1 is a block diagram illustrating a network system having a Remote Access Dial in User Service (RADIUS) server that supports bulk delivery of change of authorization (CoA) data 20 in accordance with various aspects of the techniques described in this disclosure. In this example, network system 2 includes service provider (SP) network 12 coupled to access network 4 via a broadband network gateway 10 ("BNG 10"). While FIG. 1 illustrates a BNG 10 configured to operate with a RADIUS server, it should be understood that BNG 10 may be any type of network access server.

SP network 12 supports one or more packet-based services that are available for request and use by subscriber devices 6A-6N (collectively, "subscriber devices 6"). As examples, SP network 12 may provide Internet access, bulk data delivery, Voice over Internet Protocol (VoIP), Internet Protocol television (IPTV), Short Messaging Service (SMS), Wireless Application Protocol (WAP) service, Telnet, or customer-specific application services. SP network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by a network service provider that also operates access network 4, an enterprise IP network, or some combination thereof. In various examples, SP network 12 may be connected to a public WAN, the Internet, or to other networks. SP network 12 executes one or more packet data protocols (PDPs), such as IP (IPv4 and/or IPv6), X.25 or Point-to-Point Protocol (PPP), to enable packet-based transport of SP network 12 services.

An administrator of SP network 12 (a network service provider) may deploy BNG 10 to function as a gateway to the service as provided by SP network 12. Accordingly, BNG 10 is a device or component (e.g., board or service card) within a device that provides access to SP network 12. For example, BNG 10 may represent and/or incorporate a network access server that provides dial-up or virtual private network (VPN) services to an enterprise LAN, a remote access server (e.g., broadband remote access server) or broadband services router that aggregates outputs from one or more access nodes (e.g., Digital Subscriber Line Access Multiplexers (DSLAMs), DSL access, fiber-to-the-home (FTTH) passive optical network (PON), access, etc.) into a higher-speed uplink to SP network 12, a wireless access point (WAP) providing wireless physical layer access to SP network 12, or switches that use other LAN-based (e.g., Ethernet) technologies to provide wired physical layer access to SP network 12. BNG 10 may include one or more service cards that implement a decentralized control plane for subscriber management.

Subscriber devices 6 connect to BNG 10 via access network 4 to receive connectivity to SP network 12 services for applications hosted by subscriber devices 6. Each of subscriber devices 6 may represent, for example, a workstation, desktop computer, laptop computer, cellular or other mobile device, Personal Digital Assistant (PDA), gaming console, television set-top box, smart phone, tablet computer, or any other device capable of accessing a computer network via a wireless and/or wired connection. Each of subscriber devices 6 may be associated with a subscriber (e.g., a human). Applications that access services provided by SP network 12 may alternatively be referred to as "user agents." In this example, any of subscriber devices 6 may connect to BNG 10 in order to access SP network 12. BNG 10 presents a different control plane IP address to upstream devices such as RADIUS server 14.

A network service provider (or other entity that administers SP network 12) operates or in some cases leases elements of access network 4 to provide packet transport between subscriber devices 6 and BNG 10. Access network 4 may include a broadband access network, cellular access network, a wireless LAN, a public switched telephone network (PSTN), or other type of access network. In examples of network system 2 that include a cellular access network as access network 4, BNG 10 may represent a mobile gateway, for example, a Gateway General Packet Radio Service (GPRS) Serving Node (GGSN), an Access Gateway (aGW), or a Packet Gateway (P-GW). Access network 4 may include a plurality of service virtual LANs (SVLANs) that partition elements of access network (e.g., DSLAMs) into logically different networks. Different subscriber devices 6 may therefore connect to BNG 10 using different SVLANs.

The elements of access network 4 may support any one or more of a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Using any one or more of these protocols, any of subscriber devices 6 may present authentication credentials to BNG 10 to request access to a SP network 12 service. For example, subscriber device 6A may broadcast credentials, such as a username and password, to BNG 10 to request access to a service provided by SP network 12. Subscriber devices 6 may broadcast credentials using, for instance, a PPP Password Authentication Protocol (PAP) authentication request packet to BNG 10.

BNG 10 is configured by the network service provider (or other administrative entity) as RADIUS clients to direct BNG 10 to outsource authentication, authorization, and accounting (AAA) functions to a specified RADIUS server 14, a device that receives and processes connection requests or accounting messages sent by BNG 10 or initiates changes to subscriber authorization after the subscriber has connected. Authentication is the process of verifying a subscriber identity. Authorization is the process of determining whether and the form in which an authenticated subscriber has access to SP network 12. Accounting is the process of generating records of session statistics and duration for subscribers for billing and monitoring, for example.

When BNG 10 receives authentication data from the subscriber in a request to access SP network 12 services, BNG 10 sends a RADIUS protocol Access-Request to RADIUS server 14 containing attributes 18 such as the subscriber user name and password, an identifier for BNG 10 (e.g., the "BNG-ID"), BNG 10 network address, and the Port ID the subscriber is accessing. If RADIUS server 14 includes a configuration record for the subscriber and the authentication credentials are correct, RADIUS server 14 returns a RADIUS protocol Access-Accept message to BNG 10. If a match is not found or a problem is found with the authentication credentials, the server returns an Access-Reject message. BNG 10 then establishes or terminates the user's connection. BNG 10 may then forward accounting information to RADIUS server 14 to document the transaction. RADIUS server 14 may store or forward this information to support billing for the services provided.

In some examples, RADIUS server 14 may outsource some AAA functionality to one or more backend servers, such as authentication server 22, external database 24, and remote RADIUS server 26. These backend servers are illustrated in FIG. 1 with dashed lines to indicate RADIUS server 14 may or may not, in various examples, use AAA services provided by the backend servers. Authentication server 22 is a backend authentication server, such as an RSA SecurID system, a Structured Query Language or Lightweight Directory Access Protocol (LDAP) database server, or Home Location Register, that stores as a list of subscriber accounts and subscriber account properties that can be checked by RADIUS server 14 to verify authentication credentials and queried by RADIUS server 14 to obtain subscriber account properties containing authorization and connection parameter information for subscribers. In some cases, authentication server 22 verifies authentication credentials on behalf of RADIUS server 14. External database 24 is a backend database that RADIUS server 14 may use to store accounting information. In some cases, RADIUS server 14 is a proxy server for remote RADIUS server 26.

RADIUS server 14 stores (internally or using external database 24, for example) session information in session records for respective subscriber sessions established by BNG 10. Session records include information received from BNG 10 in RADIUS request messages, such as RADIUS Accounting-Request and/or Access-Request messages. For example, a session record for a session established by BNG 10 may include a subscriber user name, a BNG-Identifier value that uniquely identifies BNG 10 to RADIUS server 14, a BNG 10 network address (e.g., an IPv4 or IPv6 address), an accounting session identifier that uniquely identifies the session on BNG 10 (e.g., "Acct-Session-Id" described in RFC 2866), and accounting information (e.g., input or output octets/packets for the session, timing information).

Radius server 14 may initiate a change of services at BNG 10 using RADIUS messages 16. That is, rather than BNG 10 requesting service configuration data from RADIUS server 14, RADIUS server 14 may "push" service configuration data to BNG 10 without a request from BNG 10. Each CoA included in RADIUS messages 16 request may be atomic. For instance, a RADIUS messages 16 may include a CoA request that has no dependency on prior or future CoA requests. As shown, each RADIUS message of RADIUS messages 16 may include one or more attributes 18. Examples of one or more attributes 18 may include, but are not limited to, radius standard attributes, vender specific attributes (VSAs), and other attributes.

During a CoA for a subscriber that has initially authenticated and authorized, RADIUS server 14 may provision one or more services using the RADIUS protocol. In some examples, a subscriber may have hundreds or thousands of services. In this example, each service may use 100-200 bytes. As such, authorization of a subscriber or CoA request for the subscriber may exceed 40 kilobytes. However, in some embodiments a RADIUS message (e.g., RADIUS packet) may contain a maximum of 4096 bytes, which is less than the 40 kilobytes for the CoA for the subscriber.

In accordance with the techniques described in this disclosure, RADIUS server 14 may determine CoA data 20 for a plurality of services to which a subscriber of SP network 12 has subscribed. For example, during CoA for a subscriber that has initially authenticated and authorized, RADIUS server 14 may determine an updated set of services for the subscriber of SP network 12. RADIUS server 14 may generate a plurality of RADIUS messages that form a transaction between RADIUS server 14 and a network access server acting as a RADIUS client. For example, RADIUS server 14 may generate RADIUS messages 16 that form a transaction between RADIUS server 14 and BNG 10. RADIUS server 14 may output the plurality of RADIUS messages to the network access server. For example, RADIUS server 14 may output RADIUS messages 16 to BNG 10, which may represent one example of a network access server.

BNG 10 may be intermediately positioned between a subscriber access device deployed by the subscriber to access the plurality of services and RADIUS server 14. For example, as shown in FIG. 1, BNG 10 may be intermediately positioned between subscriber device 6A deployed by the subscriber to access the plurality of services provided by SP network 12 and RADIUS server 14.

RADIUS server 14 may generate RADIUS messages 16 to provide all of CoA data 20 for a CoA to the network access server prior to BNG 10 provisioning any of the plurality of services. For example, rather than providing some of CoA data 20 using an individual RADIUS message of RADIUS messages 16 allowing BNG 10 to provision some of the plurality of services to which some of CoA data 20 corresponds, RADIUS server 14 may output, to BNG 10, all of RADIUS messages of RADIUS messages 16 to BNG 10. In this example, when BNG 10 determines that BNG 10 has received all of CoA data 20 via RADIUS messages 16, BNG 10 only then provisions the plurality of services for the CoA.

That is, RADIUS server 14 initiates the transaction by outputting RADIUS messages 16 with attributes 18 that indicate a bulk transaction having multiple CoA requests identified by a common transaction identifier attribute. RADIUS server 14 indicates the end of the bulk transaction using attributes 18. Attributes 18 that indicate a bulk transaction, may include, but are not limited to, a predefined end of transaction value (e.g., 4294967295 or 0xFFFFFFFF hexadecimal), an indicator (e.g., flag), or an equivalent technique or combination of equivalent techniques. For example, RADIUS server 14 may indicate the end of the bulk transaction using attributes 18 by setting attributes 18 in a particular RADIUS message of RADIUS messages 16 to a predefined end of transaction value (e.g., 4294967295 or 0xFFFFFFFF hexadecimal). In this way, BNG 10 may determine the start of a bulk transaction for CoA data 20 by parsing RADIUS messages 16 to determine attributes 18 indicating that the transaction is a bulk transaction including multiple CoA requests. BNG 10 may determine the end of the bulk transaction by parsing RADIUS messages 16 to determine a RADIUS message having attributes 18 that indicate the predefined final CoA request or end of transaction value (e.g., 0xFFFFFFFF or an equivalent value or an indicator (flag) that unambiguously denotes the end of transaction) corresponding to an end of the bulk transaction.

Figure 2:
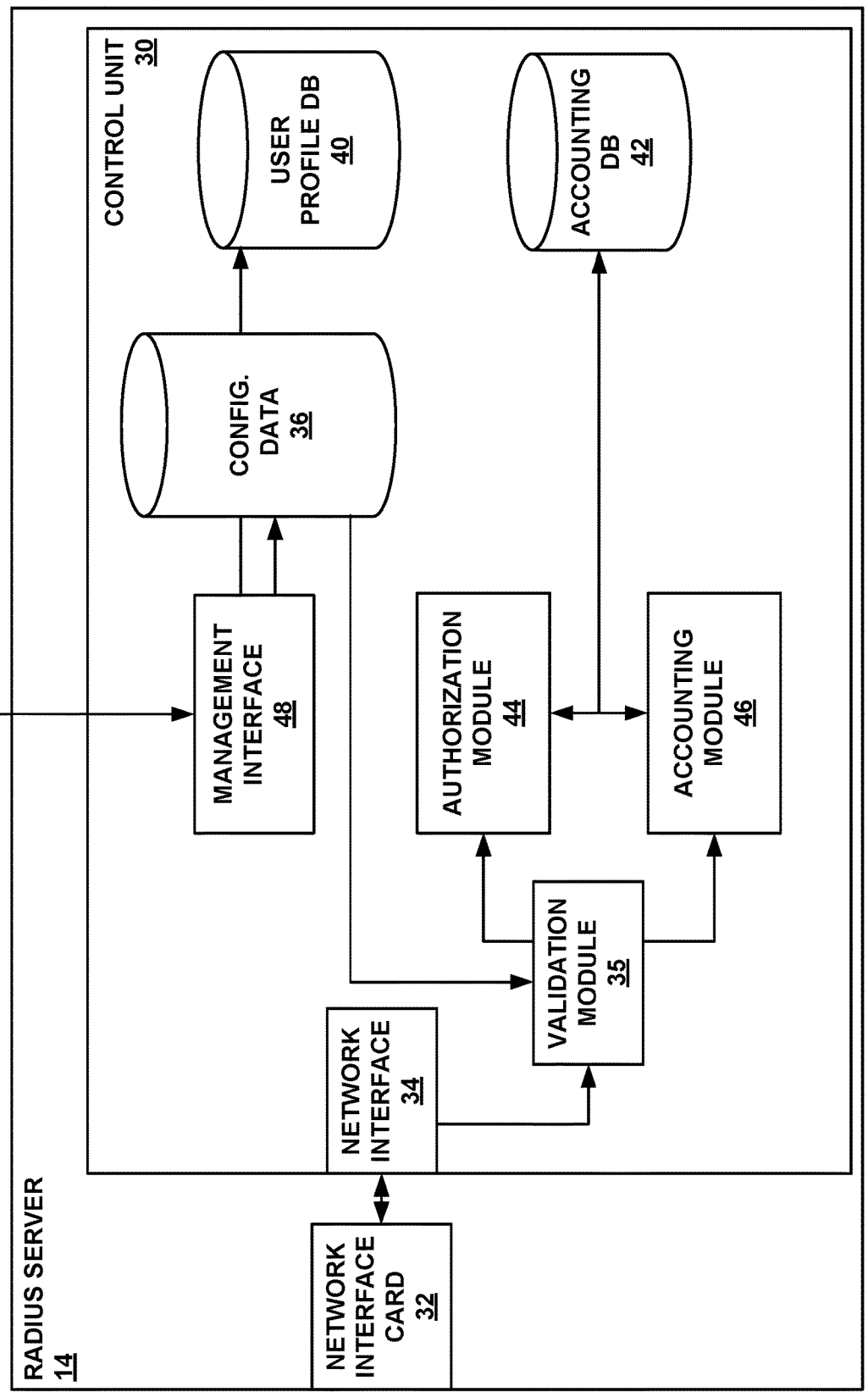
FIG. 2 illustrates, in detail, an example RADIUS server that supports bulk delivery of change of authorization data in accordance with various aspects of the techniques described in this disclosure.

FIG. 2 illustrates, in detail, an example RADIUS server 14 that supports bulk delivery of CoA data 20 in accordance with various aspects of the techniques described in this disclosure. RADIUS server 14 includes control unit 30 and network interface 32. Operation of RADIUS server 14 is described in the context of network system 2 of FIG. 1.

Control unit 30 of RADIUS server 14 provides an operating environment for executing modules, which in the illustrated example include network interface 34, validation module 35, authorization module 44, accounting module 46, and management interface 48. Control unit 30 may include one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. In this example, control unit 30 also includes computer-readable storage media to store configuration data 36, user profile database 40 (illustrated as "user profile DB 40"), and accounting database 42 (illustrated as "accounting DB 42") data structures, which may include flat files, databases, tables, trees, and/or lists, for example.

Administrator 50 represents a network service provider entity (e.g., a human or software agent) that invokes management interface 48 to configure RADIUS server 14 with configuration data of configuration data 36 and user profiles of user profile database 40. Management interface 48 may present a front-end interface, such as a web-based or other graphical user interface (GUI) or a command-line interface (CLI), to allow administrator 50 to enter configuration data. Management interface 48 may present an LDAP configuration interface for configuring and retrieving user profiles from user profile database 40. Management interface 48 may also execute Simple Network Management Protocol to enable monitoring and configuration by administrator 50.

Administrator 50 invokes management interface 48 to add RADIUS client information to configuration data 36 for each client of RADIUS server 14, such as each of BNG 10 of FIG. 1. RADIUS client information for any of BNG 10 may include the BNG network address and a RADIUS shared secret used to validate communications between RADIUS server 14 and BNG 10.

User profile database 40 stores user profiles for subscribers. A user profile may include a corresponding subscriber user name and password and/or other authentication credentials, as well as the subscriber's authorization and/or connection parameters. In some examples, user profile database 40 is a remote database to which RADIUS server 14 issues authentication and authorization requests to receive an authentication indication (e.g., accept or reject) as well as authorization and/or connection parameters.

Accounting database 42 stores subscriber accounting information for RADIUS server 14 operating as a RADIUS accounting server. Accounting database 42 may include an SQL database. In some examples, accounting database 42 is a remote database to which RADIUS server 14 issues queries to add or modify subscriber accounting information.

Network interface card 32 exchanges network packets that carry RADIUS protocol messages with BNG 10 connected to network interface card 32 by network links. Network interface card 32 exchanges network packets with network interface 34 of control unit 30.

User Datagram Protocol (UDP) datagrams carry RADIUS protocol messages. Network interface 34 implements a network stack to receive UDP messages sent to a port assigned to RADIUS and provides application data in the form of RADIUS protocol request packets to authorization module 44 and accounting module 46 for processing after a validation of the RADIUS protocol messages by validation module 35. Similarly, network interface 34 uses the network stack to encapsulate RADIUS reply packets in UDP datagrams for output by network interface card 32 to BNG 10.

Example RADIUS protocol request packets include Access-Request messages sent by a RADIUS client to request authentication and authorization for a subscriber connection and Accounting-Request messages sent by a RADIUS client to specify accounting information for a subscriber connection that has been established by the RADIUS client. Network interface 34 provides each RADIUS protocol request packet to validation module 35, which performs RADIUS client validation of the packet by confirming that the request authenticator included therein specifies the shared secret for the source network address of the RADIUS protocol request message. If RADIUS client validation fails, the packet is silently ignored/dropped. Upon successful RADIUS client validation, validation module 35 passes the RADIUS protocol request message to authorization module 44 (in the case of an Access-Request message) or to accounting module 46 (in the case of an Accounting-Request message).

Authorization module 44 processes an Access-Request message from BNG 10 by querying user profile database 40 to obtain credentials for the subscriber requesting access and attempting to validate the subscriber against the credentials. If authorization fails, authorization module 44 returns an Access-Reject message to BNG 10. If authorization is successful, authorization module 44 returns an Access-Accept message to the NAS 10.

In addition to a subscriber user name and credentials, the Access-Request message includes one or more attributes 18. Specifically, the Access-Request message includes at least one broadband network gateway (BNG) identifier (e.g., a BNG-IDentifier value and/or a BNG-IP-Address value) for BNG 10 and may in some cases include an Acct-Session-Id, as well as other attributes. When the Access-Request message includes an Acct-Session-Id and authorization is successful, authorization module 44 may in some cases access a session record by creating the session record in accounting database 42 for the authorized session to be established by BNG 10.

In accordance with the described techniques, after a subscriber has initially authenticated and authorized, authorization module 44 may modify a subscriber authorization using a CoA. Specifically, to modify the subscriber authorization, authorization module 44 may generate each RADIUS message of RADIUS messages 16 to include an identifier attribute that indicates a sequence of a respective RADIUS message in RADIUS messages 16 for a bulk transaction to process a CoA. For example, in a set of four RADIUS messages, CoA data 20 may set the identifier attribute of the first RADIUS message for a bulk transaction as '1', set the identifier attribute of the second RADIUS message for the bulk transaction as '2', set the identifier attribute of the third RADIUS message for the bulk transaction as '3', and so forth.

More specifically, for example, authorization module 44 may generate each RADIUS message of RADIUS messages 16 to include a Bulk-CoA-Identifier attribute that incrementally changes in value. For instance, for each CoA Request in a series of CoA request, authorization module 44 may generate each RADIUS message of RADIUS messages 16 with an increasing value. In some instances, for each CoA Request in a series of CoA request, authorization module 44 may generate each RADIUS message of RADIUS messages 16 with a decreasing value.

It should be understood that authorization module 44 may generate each RADIUS message of RADIUS messages 16 to include a change in value that is greater than one. For instance, in a set of four RADIUS messages, CoA data 20 may set the identifier attribute of the first RADIUS message as '1', set the identifier attribute of the second RADIUS message as '3', set the identifier attribute of the third RADIUS message as '5', and so forth.

It should also be understood that the same values may be used for bulk CoA Requests spanning different subscriber sessions or a new transaction for the same subscriber session (via a new Bulk-CoA-Transaction-Id attribute value). For example, CoA data 20 may set an identifier attribute of the first RADIUS message for a first subscriber session as '1' and set an identifier attribute of the first RADIUS message for a second subscriber session as '1'. In some instances, CoA data 20 may set an identifier attribute of the first RADIUS message for a first transaction session for a subscriber as '1' and set an identifier attribute of the first RADIUS message for a second transaction session for the subscriber as '1'.

Authorization module 44 may generate each RADIUS message of RADIUS messages 16 to include an identifier attribute that indicates whether a respective RADIUS message of RADIUS messages 16 is a final RADIUS message for the plurality of services. For example, in a set of four packets, CoA data 20 may set the identifier attribute of the fourth packet as '0xFFFFFFFF'.

Authorization module 44 may generate RADIUS messages 16 in response to a CoA for the subscriber. For example, administrator 50 may change services for a subscriber that has initially authenticated and authorized and "push" RADIUS messages 16 containing CoA data for provisioning one or more services at BNG 10. As used herein, provisioning services at BNG 10 may include provisioning a new service at BNG 10 and/or reprovisioning an existing service at BNG 10.

Figure 3:
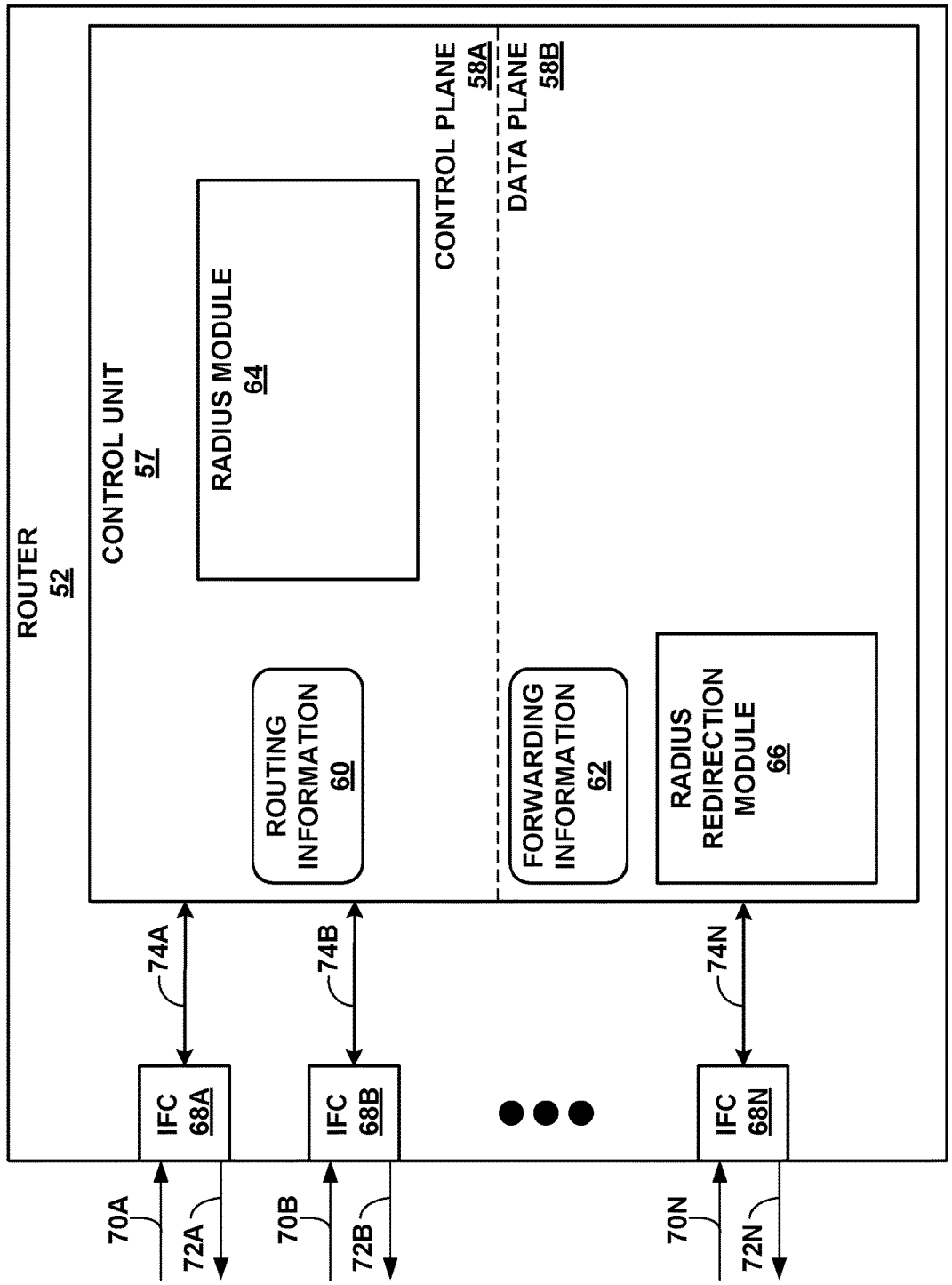
FIG. 3 illustrates, in detail, an example network access server acting as a RADIUS client that supports bulk delivery of change of authorization data in accordance with various aspects of the techniques described in this disclosure.

FIG. 3 is a block diagram illustrating, in more detail, an example of a router 52 configured to perform various aspects of the bulk authorization data delivery techniques described in this disclosure. Router 52 may represent one example of BNG 10 shown in the example of FIG. 1. Router 52 may represent any network device that performs routing functions to route data units through a network. Router 52 may route particular types of data units referred to as packets and as a result may be referred to as a "packet-based router."

Moreover, router 52 may implement layer 3 (L3) protocols or network layer protocols (where L3 refers to the L3 of the open system interconnection (OSI) model), such as an Internet Protocol (IP), and route packets according to layer 3 information. Consequently, router 52 may also be referred to as a "layer 3 router", a "network layer router," or an "IP router."

Additionally, router 52 may represent an example of a broadband network gateway (BNG), which may also be referred to as a broadband remote access server (BRAS). Acting as BNG 10, router 52 may aggregate user sessions from access network 4, and perform policy management and IP quality of service (QoS) with respect to the user sessions.

As shown in FIG. 3, router 52 includes a control unit 57. Control unit 57 may comprise one or more processors (not shown in FIG. 3) that execute software instructions, such as those used to define a software or computer program, stored to a computer-readable storage medium (again, not shown in FIG. 3), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Control unit 57 may also include, either as an alternative to the one or more processors or in addition to the one or more processors, dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 57 may be divided into two logical or physical "planes" to include a first control or routing plane 58A and a second data or forwarding plane 58B. That is, control unit 57 may implement two separate functionalities, e.g., the routing and forwarding functionalities, either logically, e.g., as separate software instances executing on the same set of hardware components, or physically, e.g., as separate physical dedicated hardware components (which may be referred to as "packet forwarding engines," abbreviated as "PFEs") that either statically implement the functionality in hardware or dynamically execute software or a computer program to implement the functionality.

Control plane 58A of control unit 57 may execute the routing functionality of router 52. In this respect, control plane 58A may represent hardware and/or software of control unit 57 that implements routing protocols (not shown in FIG. 3) by which routing information 60 may be determined. Routing information 60 may include information defining a topology of a network, such as SP network 12. Control plane 58A may resolve the topology defined by routing information 60 to select or determine one or more routes through SP network 12. Control plane 58A may then update data plane 58B with these routes, where data plane 58B maintains these routes as forwarding information 62. Forwarding or data plane 58B may represent hardware (e.g., the above noted PFEs) and/or software of control unit 57 that forwards network traffic in accordance with forwarding information 62.

Control plane 58A may further comprise a RADIUS module 64 that implements the RADIUS protocol in the manner described above with respect to BNG 10 of FIG. 1. In other words, RADIUS module 64 may interface with RADIUS server 14 on behalf of subscriber devices 6 in order to authenticate, authorize, account, and initiate CoA for access to SP network 12 by subscriber devices 6.

Data plane 58B may comprise a RADIUS redirection module 66. RADIUS redirection module 66 may represent a software and/or hardware module that inspects incoming network traffic to determine if this incoming network traffic represents RADIUS messages. RADIUS redirection module 66 may, in some instances, comprise a logic programmed within a forwarding ASIC (representative of PFEs) or other component of data plane 58B that filters traffic based on headers of the incoming network traffic or any other similar mechanism that data plane 58B may employ to distinguish particular types of network traffic from other types of network traffic.

RADIUS redirection module 66 may for example comprise one or more filters programmed within data plane 58B that listens on one or more ports assigned for RADIUS communications, e.g., UDP ports 1812 and 1813 or UDP ports 1645 and 1646. RADIUS redirection module 66 may comprise one filter that listens on these RADIUS ports, and upon receiving traffic over these ports, RADIUS redirection module 66 may determine an address to which the RADIUS communications are transmitted. RADIUS redirection module 66 may forward RADIUS messages 16 to control unit 57.

As further shown in FIG. 3, router 52 includes Interface Cards (IFCs) 68A-68N ("IFCs 68") that receive and send packet flows or network traffic via inbound network links 70A-70N ("inbound network links 70") and outbound network links 72A-72N ("outbound network links 72"), respectively. IFCs 68 are typically coupled to network links 70, 72 via a number of interface ports (not shown), and forward and receive packets and control information from control unit 57 via a respective one of paths 74A-74N ("paths 74"). Each physical interface of IFCs 68 is typically assigned a unique identifier by control unit 57, and multiple logical interfaces having unique identifiers may be assigned to each physical interface, where each logical interface represents as a distinct input or output interface for different network traffic. These logical interfaces may represent VLANs and each VLAN may be assigned a unique VLAN tag.

Router 52 may include a chassis (not shown in FIG. 3) having a number of slots for receiving a set of cards, including IFCs 68. Each card may be inserted into a corresponding slot of a chassis for communicably coupling the card to a control unit 57 via a bus, backplane, or other electrical communication mechanism.

Initially, RADIUS redirection module 66 may determine that incoming network traffic represents a RADIUS message of RADIUS messages 16 and outputs the RADIUS messages to RADIUS module 64. RADIUS module 64 determines whether all of CoA data 20 for provisioning a plurality of services at router 52 has been received.

In accordance with the techniques described in this disclosure, rather than individually provisioning each RADIUS message of RADIUS messages 16, RADIUS module 64 determines whether all of RADIUS messages 16 have been received by router 52. In response to determining that CoA data 20 for a CoA that provisions a plurality of services at router 52 has been received, RADIUS module 64 provisions the plurality of services at router 52. In this manner, RADIUS messages 16 may be provisioned in a bulk manner to provision router 52 with all services indicated by CoA data 20 included in RADIUS messages 16, thereby reducing a time to provision router 52.

RADIUS module 64 may process each CoA request included in RADIUS messages 16 one at a time and undergo initial, light-weight processing limited to any validation checks. Any remaining processing (e.g., service provisioning and commit) normally performed for a non-bulked CoA Request may be deferred until the final CoA Request in the series is received. Once initially processed, RADIUS module 64 may respond with a CoA-Nack or CoA-Ack. As used herein, a CoA-Nack may include one or more session identification attribute(s) (e.g., Acct-Session-Id), an Error-Cause (set to 404 (Invalid Request)), a Bulk-CoA-Transaction-Id and Bulk-CoA-Identifier from the CoA Request, an Action-Reason, another attribute, or a combination of one or more attributes. RADIUS module 64 may use the Action-Reason attribute to qualify the Error-Cause attribute for providing further details on the status of the CoA Request. RADIUS module 64 may use the Action-Reason in combination with Error-Cause to define the associated CoA-Request as either a logical CoA-Ack (success), a retriable failure, or an unrecoverable failure. For initial processing of the CoA Request, RADIUS module 64 may generate the Action-Reason to contain the value "Initial processing performed," which may indicate a provisional ACK, subject to successful service provisioning and commit when the final CoA Request is processed.

As noted above, RADIUS module 64 may generate a CoA-Nack with Action-Reason attribute in response to errors detected by router 52 during initial validation of the services in a CoA Request. RADIUS module 64 may defer reporting of the error until a final CoA Request is received. Said differently, RADIUS module 64 may defer reporting of an error in any RADIUS message of RADIUS messages 16 until receiving a final RADIUS message of RADIUS messages 16. Thus, authorization module 44 may continue to send the remaining CoA Requests in the series. The first, unrecoverable error detected may be the one reported via Action-Reason attribute in the CoA-Nack for the final CoA Request. Said differently, RADIUS module 64 may report an unrecoverable error via Action-Reason attribute in the CoA-Nack for the final RADIUS message of RADIUS messages 16. Note that there may be some error conditions described later in this document in which the detected error may not be deferred to the final CoA Request and instead reported in the CoA-Nack response for the CoA Request that triggered the error.

Upon receipt of the final CoA Request, if RADIUS module 64 detects a validation error in any CoA Request that is prior in the series to an instant CoA request, a CoA-Nack may be issued with Action Reason attribute reporting an error. Said differently, if RADIUS module 64 detects a validation error in any prior RADIUS message of RADIUS messages 16, RADIUS module 64 may issue a CoA-Nack with Action-Reason attribute reporting an error string. Otherwise, RADIUS module 64 may commence creating and/or removing services from the CoA Requests in the series, including commit of the configuration. Said differently RADIUS module 64 may provision one or more services based on the RADIUS messages 16. The intent may be for all service activations to be applied as a single installation. While the services are being installed, normal RADIUS retry semantics may apply. The semantics for responding may match that of a single, non-bulked CoA Request. That is, the CoA response is not issued until the services are installed, or an unrecoverable error is detected to result in a CoA-Nack with Action-Reason attribute reflecting the detected error. Said differently, RADIUS module 64 may not output, to RADIUS server 14 an acknowledgment until all the services of RADIUS messages 16 are successfully provisioned or RADIUS module 64 detects an unrecoverable error. If RADIUS server 14 retries the final CoA Request while the services are being installed, RADIUS module 64 may respond with a CoA Nack with Action Reason attribute reporting "In Progress".

RADIUS module 64 may limit the number of aggregate services allowable for a subscriber and thus the number of services that are allowed in a bulk CoA transaction for a subscriber to ensure this limit is not exceeded. When a subscriber's maximum services limit is reached before receiving the final CoA Request, RADIUS module 64 may abort the bulk-CoA request and respond with a CoA-Nack with Action Reason attribute indicating "Services limit exceeded." In response, RADIUS server 14 may cease sending further CoA Requests for this transaction and clean-up. Note that this CoA-Nack response may be offered for all subsequent CoA Requests, including the final one, that are received for this transaction. Also, all services that exist for the subscriber session prior to this bulk-CoA transaction may be maintained. For example, assuming a subscriber is limited to 1000 services and the subscriber already has 980 services, and RADIUS module 64 receives the following CoA Request transaction tuples (Bulk-CoA-Transaction-Id, Bulk-CoA-Identifier), with each CoA-Request containing 10 services: (11,1), (11,2), (11,3), RADIUS module 64 may respond with CoA Nack (11, 3, Error-Cause=404, Action-Reason="Services limit exceeded"). In this example, in response to further receiving the following CoA request transaction (11,4), RADIUS module 64 may respond with CoA Nack (11, 4, Error-Cause=404, Action-Reason="Services limit exceeded"). In this example, in response to further receiving the following, final CoA request for this transaction (11,0xFFFFFFFF), RADIUS module 64 may respond with a CoA-Nack (11, 4, Error-Cause=404, Action-Reason="Services limit exceeded"). In this manner, RADIUS module 64 may maintain the existing 980 services prior to this bulk-CoA transaction.

RADIUS module 64 may limit the number of CoA Requests, spanning a bulk-CoA transaction based on the assumption that each CoA Request will contain multiple, services When the limit is reached before receiving the final CoA Request, RADIUS module 64 may abort the bulk-CoA request and respond with a CoA-Nack with Action Reason attribute indicating "Bulk request message limit exceeded." In response, RADIUS server 14 may cease sending further CoA Requests for this transaction and clean-up. Note that this CoA-Nack Nack response may be offered for all subsequent CoA Requests that are received for this transaction. Also, RADIUS module 64 may maintain all services that exist for the subscriber session prior to this bulk-CoA transaction.

For example, assuming a maximum CoA Request per bulk-CoA transaction limit of 75, RADIUS module 64 may receive a bulk-CoA transaction of 77 CoA Requests with the following CoA Request transaction tuples (Bulk-CoA-Transaction-Id, Bulk-CoA-Identifier): (210,1), (210,2), (210,3), . . . (210,75), (210, 76), RADIUS module 64 may respond with a CoA Nack (210, 76, Error-Cause=404, Action-Reason="Bulk request message limit exceeded"). In this example, in response to further receiving the following CoA request transaction (210,77), RADIUS module 64 may respond with a CoANack (210, 77, Error-Cause=404, Action-Reason ="Bulk request message limit exceeded"). In this example, in response to further receiving the following, final CoA request for this transaction (210,0xFFFFFFFF), RADIUS module 64 may respond with a CoA Nack (210, 0xFFFFFFFF, Error-Cause=404, Action-Reason="Bulk request message limit exceeded").

Until the final CoA Request Message is received in the series, in response to a received CoA Request with a duplicate Bulk-CoA-Identifier, RADIUS module 64 may perform the following: If the identifier matches the most recently processed, non-final Bulk-CoA-Identifier in the series, RADIUS module 64 may determine that the received CoA request is a duplicate request. If the CoA Request has already been processed, RADIUS module 64 may respond with a CoA-Nack with Action-Reason attribute "Initial processing performed" (the assumption is the prior CoA-Nack was lost). If the CoA Request is in progress, RADIUS module 64 may silently drop the duplicate CoA Request based on the assumption that the delay is temporal and initial processing minimal.

For example, RADIUS module 64 receives the following CoA Request transaction tuples (Bulk-CoA-Transaction-Id, Bulk-CoA-Identifier) for the same subscriber: (10,1) and responds with CoA Nack (10, 1, Error-Cause=404, Action-Reason="Initial processing performed"), receives (10,2) and responds with CoA Nack (10, 2, Error-Cause=404, Action-Reason="Initial processing performed"), and receives (10,2) <prior CoA-Nack for (10,2) is presumed to be lost> and responds with CoANack (10, 2, Error-Cause=404, Action-Reason="Initial processing performed"). In some examples, RADIUS module 64 receives the following CoA Request transaction tuples (Bulk-CoA-Transaction-Id, Bulk-CoA-Identifier) for the same subscriber: (10,1) and responds with CoANack (10, 1, Error-Cause=404, Action-Reason="Initial processing performed"), receives (10,2) <initial processing in-progress>, and receives (10,2) again <silently dropped by RADIUS module 64>, and responds with CoA Nack (10, 2, Error-Cause=404, Action-Reason="Initial processing performed"). If the final CoA Request processing is in-progress and a duplicate final CoA Request is received, RADIUS module 64 may respond with a CoA-Nack with Action-Reason attribute indicating "In progress". Otherwise, RADIUS module 64 may have completed CoA Request processing, and RADIUS module 64 may respond with CoA-Nack with Action-Reason attribute indicating the result of the operation ("Service active" for the success case).

For example, RADIUS module 64 receives the following CoA Request transaction tuples (Bulk-CoA-Transaction-Id, Bulk-CoA-Identifier) for the same subscriber: (27,1), (27,2), (27,3) . . . (27,0xFFFFFFFF), RADIUS module 64 may commence service install upon receiving final CoA Request (27,0xFFFFFFFF). In this example, in response to further receiving the following CoA request transaction (27, 0xFFFFFFFF), RADIUS module 64 may respond with CoANack (27, 0xFFFFFFFF, Error-Cause=404, Action-Reason="In progress"). In this example, in response to further receiving the following CoA request transaction (27,0xFFFFFFFF) after service installation has completed, RADIUS module 64 may respond with CoA Nack (27, 0xFFFFFFFF, Error-Cause=404, Action-Reason ="Service active").

If the Bulk-CoA-Identifier in a CoA Request is less than the most recently processed Bulk-CoA-Identifier in the series, the identifier may imply that the RADIUS is out-if-sync. RADIUS module 64 may not verify whether a CoA Request was actually received with this lesser, unexpected Bulk-CoA-Identifier and may discard the CoA-Request without responding. This may force RADIUS server 14 to replay the sequence with a new transaction-id (or disconnect the subscriber). This semantic may apply even when the final CoA Request is received and the transaction completes (e.g., successfully or unsuccessfully) to enforce the requirement that the next transaction for the same subscriber use a different Bulk-CoA-Transaction-Id from the prior one. In response to using the same Bulk-CoA-Transaction-Id, RADIUS module 64 may determine that the Bulk-CoA-Transaction-Id is a replay of the prior transaction for the subscriber and thus discarded.

For example, RADIUS module 64 receives the following CoA Request transaction tuples (Bulk-CoA-Transaction-Id, Bulk-CoA-Identifier) for the same subscriber: (10,100), RADIUS module 64 may respond with CoA Nack (10, 100, Error-Cause=404, Action-Reason="Initial processing performed"). In this example, in response to further receiving the following CoA request transaction (10,101), RADIUS module 64 may respond with CoA Nack (10, 101, Error-Cause=404, Action-Reason ="Initial processing performed"). In this example, in response to further receiving the following CoA request transaction (10,102), RADIUS module 64 may respond with CoA Nack (10, 102, Error-Cause=404, Action-Reason="Initial processing performed"). In this example, in response to further receiving the following CoA request (10,101), RADIUS module 64 may silently drop this CoA Request. In this example, in response to further receiving the following CoA request (10,50), RADIUS module 64 may silently drop this CoA Request. Note that RADIUS module 64 may use a timer to detect the receipt of the next or final CoA Request in the series that is not reset when a CoA Request with a Bulk-CoA-Identifier less than the most recently processed identifier is received.

For a bulk-CoA transaction, a timer (e.g., 30 seconds) may be used to detect the receipt of the next or final CoA Request in the series. The timer is started once the CoA Response is issued for a non-final CoA Request. If the timer expires, RADIUS module 64 may determine that the current Bulk-CoA-Transaction-Id is invalid, and all services from the prior CoA Request(s) for this transaction may be subject to clean-up. If RADIUS server 14 continues sending CoA Requests or replays the CoA Request sequence from the beginning using the same Bulk-CoA-Transaction-Id, RADIUS module 64 may respond with CoA-Nack with Action Reason attribute indicating "CoA request timeout" to each CoA Request belonging to this invalid transaction.

For example, RADIUS module 64 receives the following CoA Request transaction tuples (Bulk-CoA-Transaction-Id, Bulk-CoA-Identifier): (1,1), (1,2), (1,3) followed by a 30 second timeout. In the example, resuming or replaying the transaction may be disallowed. For instance, in response to receiving the following CoA Request (1,4) (e.g., resuming), RADIUS module 64 may respond with CoA Nack (1, 4,Error-Cause=404, Action-Reason="CoA request timeout"). For instance, in response to receiving the following CoA Request (1,1) (e.g., replaying), RADIUS module 64 may respond with CoA Nack (1, 1, Error-Cause=404, Action-Reason="CoA request timeout"). In some instances, in response to receiving the following, final CoA Request (1, 0xFFFFFFFF), RADIUS module 64 may respond with CoA Nack (1, 0xFFFFFFFF, Error-Cause=404, Action-Reason="CoA request timeout").

In response to a timeout, RADIUS server 14 may be expected to replay the transaction using a different Bulk-CoA-Transaction-Id value. For example, RADIUS module 64 may receive (2,1), (2,2), (2,3), (2,4), (2,5), (2, 0xFFFFFFFF) to replay and complete the CoA Request transaction tuples.

For a bulk-CoA transaction, if a logout is initiated (e.g., RADIUS CoA Disconnect Request initiated by RADIUS server 14, administratively initiated from Router 52, subscriber initiated, etc.) after the first CoA Request but before the final CoA Request is received in the series, RADIUS module 64 may abort the bulk-CoA transaction. RADIUS module 64 may respond with a CoA-Nack with Action Reason attribute indicating "Logout in progress" for any CoA-Request received after logout commences.

For example, RADIUS module 64 receives the following CoA Request transaction tuples (Bulk-CoA-Transaction-Id, Bulk-CoA-Identifier) for the same subscriber: (222,1), (222, 2), (222,3), and responds with CoA Nack (222, 3, Error-Cause=404, Action-Reason="Initial processing performed"). In this example, RADIUS server 14 initiates a RADIUS Disconnect Message. In this example, RADIUS module 64 then receives CoA Request transaction tuple (222,4) and outputs CoA Nack (222, 4, Error-Cause=404, Action-Reason ="Logout in progress").

If either the Bulk-CoA-Transaction-Id or Bulk-CoA-Identifier attribute is an invalid value (e.g., 0), or one of the two attributes is not present, RADIUS module 64 may drop the CoA Request without a response. If a transaction is in-progress, the discarded CoA Request will not prevent the transaction from continuing and completing (i.e., the effect is as if the CoA Request had not been received).

Figure 4:
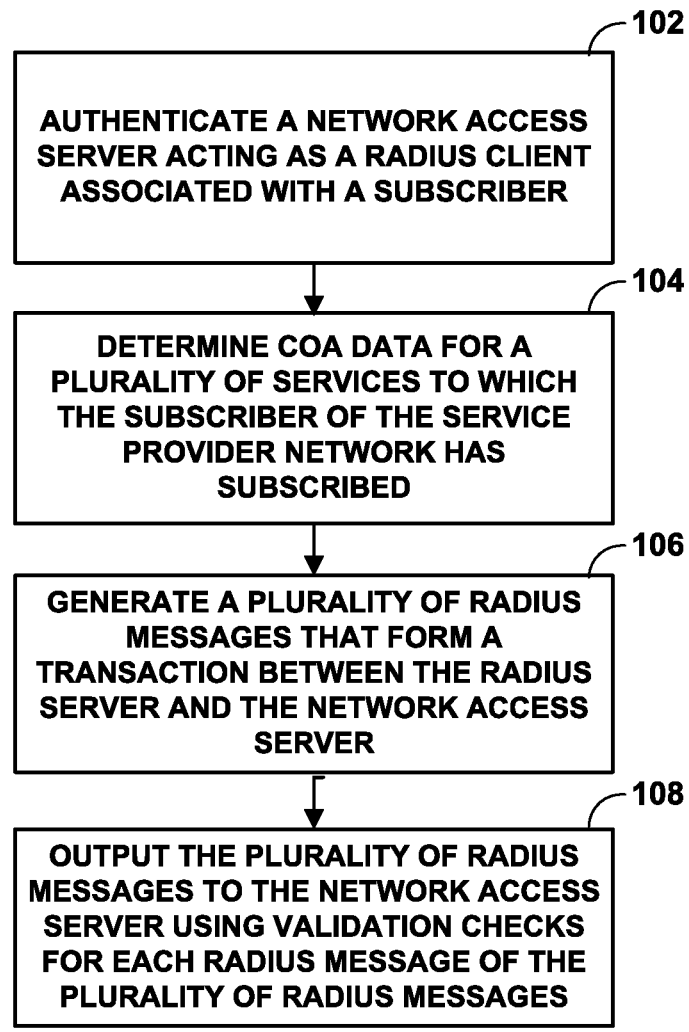
FIG. 4 is a flowchart illustrating an example mode of operation for a RADIUS server that supports bulk delivery of change of authorization data in accordance with various aspects of the techniques described in this disclosure.

FIG. 4 is a flowchart illustrating an example mode of operation for RADIUS server 14 that supports bulk delivery of CoA data 20 in accordance with various aspects of the techniques described in this disclosure. The example mode of operation is described with respect to RADIUS server 14 of FIG. 2.

Management interface 48 authenticates a network access server acting as a RADIUS client associated with a subscriber (102). For example, in response to verifying authentication data received from BNG 10 of FIG. 1, management interface 48 authenticates BNG 10. Authorization module 44 determines CoA data 20 for a plurality of services for a CoA to which the subscriber of SP network 12 has subscribed (104). After the subscriber is initially authenticated and authorized, authorization module 44 generates RADIUS messages that form a transaction between the RADIUS server and the network access server (106). For example, authorization module 44 generates RADIUS messages 16 of FIG. 1 that form a transaction between RADIUS server 14 and BNG 10 of FIG. 1. Authorization module 44 outputs or "pushes" the plurality of RADIUS messages to the network access server which performs validation checks for each RADIUS message of the plurality of RADIUS messages (108). For example, authorization module 44 outputs RADIUS messages 16 to BNG 10 of FIG. 1, the latter performing validation checks for each RADIUS message of RADIUS messages 16.

Figure 5:
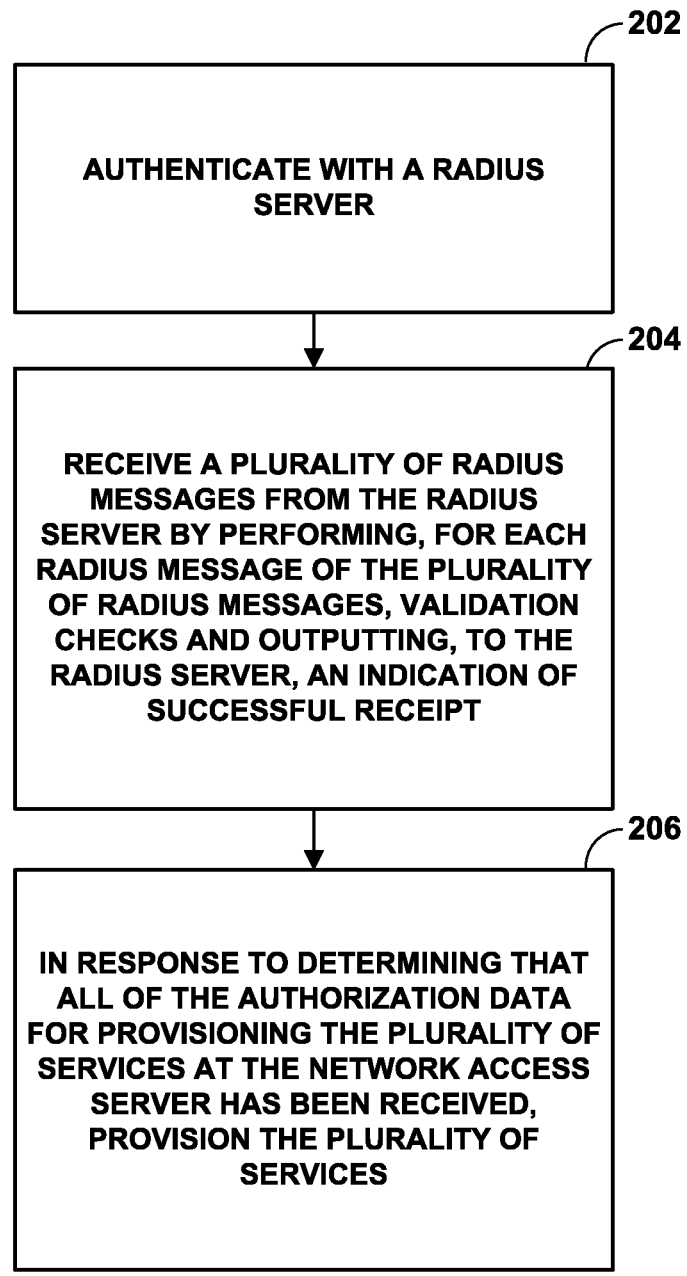
FIG. 5 is a flowchart illustrating an example mode of operation for a network access server acting as a RADIUS client that supports bulk delivery of change of authorization data in accordance with various aspects of the techniques described in this disclosure.

FIG. 5 is a flowchart illustrating an example mode of operation of router 52 configured to support bulk delivery of CoA data 20 in accordance with various aspects of the techniques described in this disclosure. The example mode of operation is described with respect to router 52 of FIG. 3.

RADIUS module 64 initially authenticates with RADIUS server 14 (202). After a subscriber has initially authenticated and authorized, RADIUS module 64 receives RADIUS messages 16 from the RADIUS server 14 by performing, for each RADIUS message of RADIUS messages 16, validation checks and outputting, to RADIUS server 14, an indication of successful receipt (204). In response to determining that all of CoA data 20 for provisioning the plurality of services at RADIUS module 64 has been received, RADIUS module 64 provisions the plurality of services for a CoA using RADIUS messages 16 (206).

Figure 6:
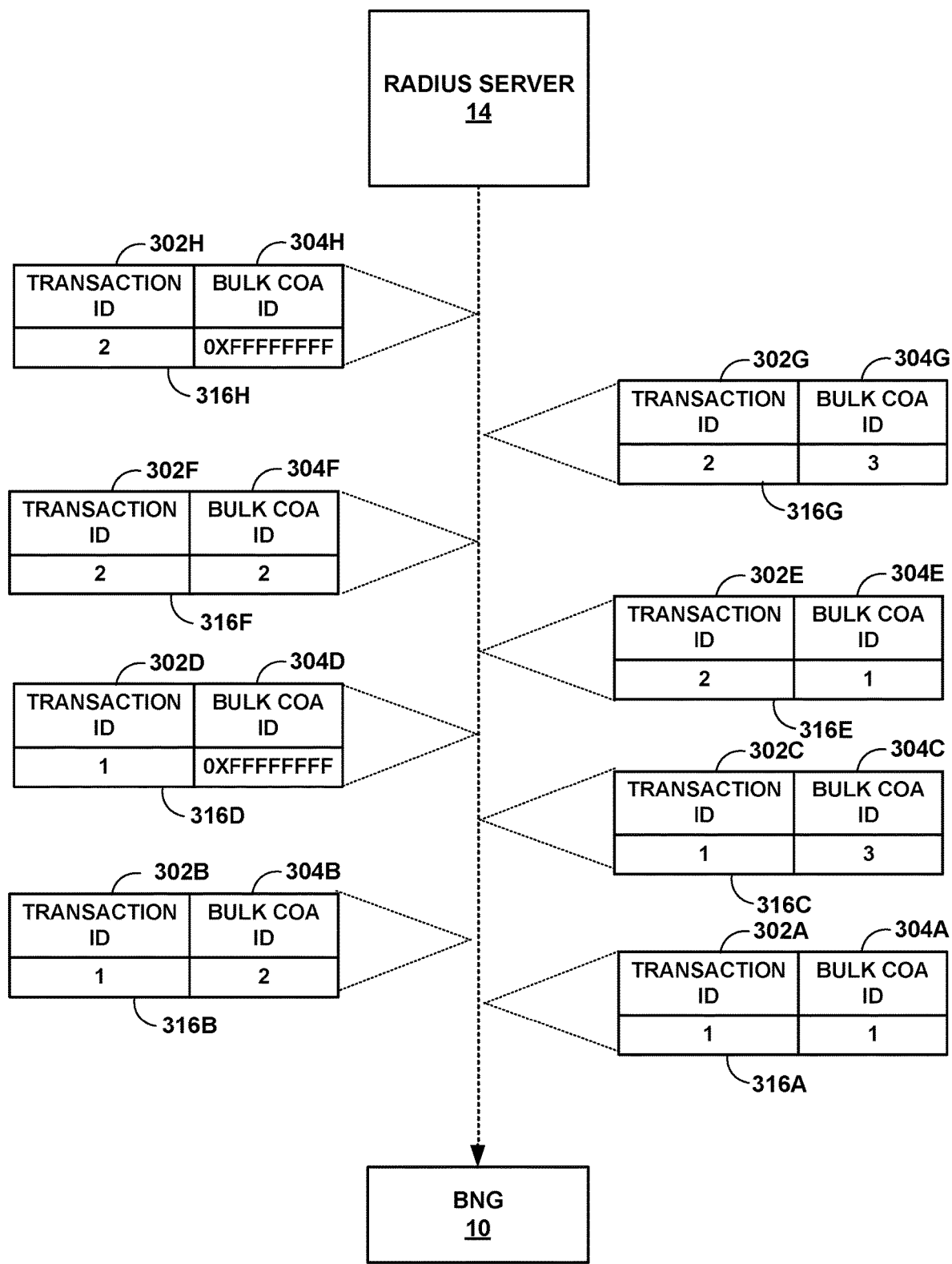
FIG. 6 is a block diagram illustrating an example change of authorization (CoA) request formed in accordance with various aspects of the bulk authorization data delivery techniques described in this disclosure.

FIG. 6 is a block diagram illustrating an example CoA request formed in accordance with various aspects of the bulk authorization data delivery techniques described in this disclosure. As shown, FIG. 6 includes RADIUS messages 316A-H (hereinafter, "RADIUS messages 316"), which may represent one example of RADIUS messages 16 shown in FIG. 1.

Each RADIUS message of RADIUS messages 316 includes a respective CoA Transaction ID 302A-H (collectively, "CoA Transaction ID 302") that is a common identifier or tag to associate the series of related CoA Requests as a transaction. This attribute may be a non-zero, four-octet integer. The value 0 may be reserved. Alternatively this attribute may be a string.

When a subscriber session is configured via a bulk-CoA, each RADIUS message 316 (e.g., CoA Request) in the series may contain exactly one instance of CoA Transaction ID 302. The value of CoA Transaction ID 302 may be identical for all CoA Requests spanning a bulk-CoA transaction for a given subscriber session. For example, as shown in FIG. 6, RADIUS messages 316A-D include CoA Transaction ID 302A-D indicating a first transaction '1'. In this example, RADIUS messages 316E-H include CoA Transaction ID 302E-H indicating a second transaction '2'.

RADIUS server 14 may use a monotonically increasing number for each bulk-CoA transaction indicated by CoA Transaction ID 302, but it will not be enforced by BNG 10. The only requirement is that a unique value is used to identify two consecutive bulk-CoA transactions for the same subscriber session. The same value, however, may be used for bulk-CoA transactions for different subscriber sessions. Also, the value may repeat for a given subscriber session, provided it's not successive (thus, the transaction-id series 1, 2, 1 may be allowed).

Each RADIUS message of RADIUS messages 316 may include a respective Bulk CoA ID 304A-H (collectively, "Bulk CoA ID 304"). Bulk CoA ID 304 may specify a unique identifier for each RADIUS message 316 (e.g., CoA Request message) that is part of the same transaction as specified by Bulk CoA Transaction ID 302. This attribute is a non-zero, four-octet integer. The value 0 may be reserved.

When a subscriber session is configured via a bulk-CoA, each CoA Request in the series may be configured to contain exactly one instance of Bulk CoA ID 304 specifying a value that is greater than the one for the prior CoA-Request for the transaction. As the Bulk CoA ID values represent a sequence, an increasing or decreasing sequence may be used such that a single value is reserved to represent the final CoA Request, where an increasing sequence is a more conventional approach that is described throughout. Thus Bulk CoA ID 304 for CoA Requests of a given transaction may represent an increasing series of numbers (where a monotonically increasing number is a natural semantic but not enforced). The final CoA Request in the series may use a reserved value such as 0xFFFFFFFF as means to denote the end of the transaction. For example, as shown in FIG. 6, Bulk CoA ID 304C, having a value of '3', is monotonically increasing from Bulk CoA ID 304B, having a value of '2'. In this example, Bulk CoA ID 304B, having a value of '2', is monotonically increasing from Bulk CoA ID 304A, having a value of '1'. Further, the final CoA Request indicated by RADIUS message 316D has a Bulk CoA ID 304D, having a value of '0xFFFFFFFF' as means to denote the end of the first transaction indicated by Bulk CoA Transaction ID 302D as '1'.

The same series of values may be used for bulk-CoA transactions for different subscriber sessions. Also, the values may repeat for a given subscriber session. For example, as shown in FIG. 6, Bulk CoA ID 304A, having a value of '1' for the first transaction indicated by Bulk CoA ID 304A as '1' is repeated by Bulk CoA ID 304E, having a value of '1' for the second transaction indicated by Bulk CoA Transaction ID 302E as '2'.

A CoA Request may be thus represented as a unique identifier (tuple) of (Bulk-CoA-Transaction-Id, Bulk-CoA-Identifier) for a given subscriber session, which has a unique session identifier (e.g., Acct-Session-Id). For example, a bulk-CoA transaction for a given subscriber session containing four, individual CoA requests may be numbered as follows: (1,1), (1,2), (1,3), and (1,0xFFFFFFFF). For example, as shown in FIG. 6, RADIUS messages 316A-D may each include a CoA Transaction ID 302 indicating '1' to denote a first unique session identifier. In this example, RADIUS messages 316A-D may include four individual CoA requests indicated by: Bulk CoA ID 304A, indicating a value '1', Bulk CoA ID 304B, indicating a value '2', Bulk CoA ID 304C, indicating a value '3', and Bulk CoA ID 304D, indicating a value '0xFFFFFFFF'.

The next bulk-CoA transaction for the same subscriber session may be numbered as follows: (2,1), (2,2), (2,3), . . . , (2,0xFFFFFFFF). For example, as shown in FIG. 6, RADIUS messages 316E-H may each include a CoA Transaction ID 302 indicating '2' to denote a second unique transaction identifier. In this example, RADIUS messages 316E-H may include three individual CoA requests indicated by: Bulk CoA ID 304E, indicating a value '1', Bulk CoA ID 304F, indicating a value '2', Bulk CoA ID 304G, indicating a value '3', and Bulk CoA ID 304H, indicating a value '0xFFFFFFFF'.

Some bulk CoA mechanisms described herein may be backwardly compatible with a non-bulked CoA mechanism, such that a non-bulk CoA implies no relationship exists between CoA Request messages, and thus service creation or deletion may be performed on CoA Request boundaries.

Thus non-bulked and bulked CoA described herein may both be used to configure the same subscriber. With the exception of the new attributes (e.g., CoA Transaction ID 302 and Bulk CoA ID 304), the attributes contained in the individual CoA Request messages may generally match those that would be used if a subscriber session were configured as a series of non-bulked CoA requests. This implies that each CoA Request may contain session identification attribute(s) (e.g., Acct-Session-Id) and that one or more attributes used to create or delete a distinct subscriber service. Additionally, requests that all attributes used to create or delete a subscriber service may be contained within the same (e.g., single) CoA Request message. The Bulk-CoA-Transaction-Id and Bulk-CoA-Identifier attributes (e.g., Bulk CoA Transaction ID 302 and Bulk CoA ID 304) may be included in each CoA Request to associate them as a single transaction.

If a CoA Request is received with a different Bulk-CoA-Transaction-Id value (e.g., Bulk CoA Transaction ID 302) from the one established by the prior CoA Requests, BNG 10 may abort the current transaction and clean-up all services from the prior CoA Requests. No CoA response may be offered for this aborted transaction. The transition to a new transaction-id (e.g., CoA Transaction ID 302) may imply a full replay will be performed by RADIUS server 14.

For example, BNG 10 receives the following CoA Request transaction tuples (Bulk-CoA-Transaction-Id, Bulk-CoA-Identifier) (e.g., CoA Transaction ID 302 and Bulk CoA ID 304) for the same subscriber: (1,11), (1,12), (1,13), (2,11), (2,12), (2,13), (2,14), (2,0xFFFFFFFF). The tuple (2,11) may trigger an abort of transaction-id=1 for the subscriber session. Said differently, BNG 10 may abort the first transaction in response to receiving (2,11) because the transaction indicated by the Bulk-CoA-Transaction-Id (e.g., CoA Transaction ID 302) changes to indicate a second transaction without an indication of an end of the first transaction (e.g., Bulk CoA ID 304 indicating '0xFFFFFFFF'). In this example, BNG 10 may apply the bulk-CoA of transaction-id=2 to the subscriber instead.

In response to receiving a RADIUS message (e.g., CoA Request) Bulk-CoA-Identifier attribute (e.g., Bulk CoA ID 304) containing the value 0xFFFFFFFF, when service processing and installation (or de-installation) completes (either successfully or otherwise), BNG 10 may respond with a CoA-Ack or CoA-Nack which may include: Session identification attribute(s) (e.g., Acct-Session-Id); Error-Cause (set to 404 (Invalid Request))-CoA-Nack only; and Bulk-CoA-Transaction-Id and Bulk-CoA-Identifier attributes from the CoA Request. Note that Bulk-CoA-Identifier will have the value 0xFFFFFFFF. For CoA-Nack, Action Reason attribute will be included, reflecting the status of the bulk-CoA operation.

When BNG 10 detects an unreturnable error (e.g., one that will not be treated as a logical CoA-Ack by RADIUS), BNG 10 may roll-back (clean-up) the services from the bulk CoA. Unrecoverable errors may be likely to require some user intervention outside BNG 10 before retrying (e.g., fix in the service format or configuration). BNG 10 may maintain the transaction-id mapping until the Bulk-CoA-Transaction-Id changes. Once the error is resolved, the bulk-CoA may be retried in its entirety using a new transaction-id.

Retriable errors may be treated similarly. The difference is that RADIUS server 14 may retry immediately without requiring user intervention. Note that retry implies replaying the bulk-CoA request in its entirety using a new Bulk-CoA-Transaction-Id to allow BNG 10 to maintain consistent error semantics.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    determining, by a Remote Authentication Dial-In User Service (RADIUS) server for a service provider network, change of authorization data for a plurality of services to which a subscriber of the service provider network has subscribed;
    generating, by the RADIUS server, a plurality of RADIUS messages that form a transaction between the RADIUS server and a network access server acting as a RADIUS client, wherein each RADIUS message of the plurality of RADIUS messages includes a respective portion of the change of authorization data and wherein a combination of all of the respective portions of the change of authorization data included in the plurality of RADIUS messages provides all of the change of authorization data to the network access server prior to the network access server provisioning the plurality of services to reduce a time to provision the network access server with the plurality of services, the network access server being intermediately positioned between a subscriber access device deployed by the subscriber to access the plurality of services and the RADIUS server; and
    outputting, by the RADIUS server, the plurality of RADIUS messages to the network access server.

2. The method of claim 1, wherein each message of the plurality of RADIUS messages includes an identifier attribute that indicates a sequence of a respective RADIUS message in the plurality of RADIUS messages.

3. The method of claim 1, wherein:
each RADIUS message of the plurality of RADIUS messages includes an identifier attribute that indicates whether a respective RADIUS message of the plurality of RADIUS messages is a final RADIUS message for the plurality of services that terminates the transaction; and
the network access server is configured to provision the plurality of services in response to receiving the final RADIUS message.

4. The method of claim 1, wherein the RADIUS server generates the plurality of RADIUS messages in response to a change of authorization for the subscriber.

5. The method of claim 1, wherein outputting the plurality of RADIUS messages to the network access server comprises:
outputting, by the RADIUS server, a first RADIUS message of the plurality of RADIUS messages to the network access server; and
in response to receiving an indication from the network access server that the first RADIUS message was received, outputting, by the RADIUS server, a second RADIUS message of the plurality of RADIUS messages to the network access server.

6. The method of claim 1, wherein each message of the plurality of RADIUS messages includes a bulk change of authorization transaction identifier attribute that indicates that the transaction is a bulk transaction having multiple change of authorization requests.

7. A server that provides authentication, authorization, and accounting services for a service provider network, the server comprising:
one or more processors coupled to a memory; and
a Remote Authentication Dial-In User Service (RADIUS) module implemented in circuitry and configured to:
determine change of authorization data for a plurality of services to which a subscriber of the service provider network has subscribed;
generate a plurality of RADIUS messages that form a transaction between the RADIUS server and a network access server acting as a RADIUS client, wherein each RADIUS message of the plurality of RADIUS messages includes a respective portion of the change of authorization data and wherein a combination of all of the respective portions of the change of authorization data included in the plurality of RADIUS messages provides all of the change of authorization data to the network access server prior to the network access server provisioning the plurality of services to reduce a time to provision the network access server with the plurality of services, the network access server being intermediately positioned between a subscriber access device deployed by the subscriber to access the plurality of services and the RADIUS server; and
output the plurality of RADIUS messages to the network access server.

8. The server of claim 7, wherein each message of the plurality of RADIUS messages includes an identifier attribute that indicates a sequence of a respective RADIUS message in the plurality of RADIUS messages.

9. The server of claim 7, wherein:
each RADIUS message of the plurality of RADIUS messages includes an identifier attribute that indicates whether a respective RADIUS message of the plurality of RADIUS messages is a final RADIUS message for the plurality of services that terminates the transaction; and
the network access server is configured to provision the plurality of services in response to receiving the final RADIUS message.

10. The server of claim 7, wherein the RADIUS module is configured to generate the plurality of RADIUS messages in response to a change of authorization for the sub scriber.

11. The server of claim 7, wherein to output the plurality of RADIUS messages to the network access server, the RADIUS module is configured to:
output a first RADIUS message of the plurality of RADIUS messages to the network access server; and
in response to receiving an indication from the network access server that the first RADIUS message was received, output a second RADIUS message of the plurality of RADIUS messages to the network access server.

12. The server of claim 7, wherein each message of the plurality of RADIUS messages includes a bulk change of authorization transaction identifier attribute that indicates that the transaction is a bulk transaction having multiple change of authorization requests.

13. A method comprising:
receiving, by a network access server associated with a subscriber of a service provider network and acting as a Remote Authentication Dial-In User Service (RADIUS) client, from a RADIUS server for the service provider network, a plurality of RADIUS messages that form a transaction between the RADIUS server and the network access server to provide change of authorization data for provisioning the plurality of services at the network access server, wherein each RADIUS message of the plurality of messages includes a respective portion of the change of authorization data and wherein a combination of all of the respective portions of the change of authorization data included in the plurality of RADIUS messages provides all of the change of authorization data to the network access server prior to the network access server provisioning the plurality of services to reduce a time to provision the network access server with the plurality of services, the network access server being intermediately positioned between a subscriber access device deployed by the subscriber to access the plurality of services and the RADIUS server; and
in response to determining that all of the change of authorization data for provisioning the plurality of services at the network access server has been received, provisioning, by the network access server, the plurality of services.

14. The method of claim 13, wherein each message of the plurality of RADIUS messages includes an identifier attribute that indicates a sequence of a respective RADIUS message in the plurality of RADIUS messages, the method further comprising:
determining, by the network access server, whether all of the change of authorization data for provisioning the plurality of services at the network access server has been received based on the sequence of a respective RADIUS message in the plurality of RADIUS messages.

15. The method of claim 13, wherein each RADIUS message of the plurality of RADIUS messages includes an identifier attribute that indicates whether a respective RADIUS message of the plurality of RADIUS messages is a final RADIUS message for the plurality of services that terminates the transaction, the method further comprising:
- determining, by the network access server, whether all of the change of authorization data for provisioning the plurality of services at the network access server has been received in response to receiving the final RADIUS message.

16. The method of claim 13, wherein the RADIUS server generates the plurality of RADIUS messages in response to a change of authorization for the subscriber.

17. The method of claim 13, wherein receiving the plurality of RADIUS messages comprises:
- receiving, by the network access server, a first RADIUS message of the plurality of RADIUS messages to the network access server;
- determining whether the first RADIUS message contains an error; and
- in response to determining that the first RADIUS message does not contain an error, outputting, by the network access server, to the RADIUS server, an indication from the network access server that the first RADIUS message was received, wherein the RADIUS server outputs a second RADIUS message of the plurality of RADIUS messages to the network access server in response to receiving the indication from the network access server that the first RADIUS message was received.

18. The method of claim 13, wherein each message of the plurality of RADIUS messages includes a bulk change of authorization transaction identifier attribute that indicates that the transaction is a bulk transaction having multiple change of authorization requests.

19. The method of claim 13, wherein receiving the plurality of RADIUS messages comprises:
- receiving, by the network access server, from the RADIUS server, a first RADIUS message of the plurality of RADIUS messages; and
- in response to determining that a second RADIUS message of the plurality of RADIUS messages is not received by the network access server prior to expiration of a timer, outputting, by the network access server, to the RADIUS server, an indication to abort the transaction.

* * * * *